United States Patent [19]
Yamazaki et al.

[11] Patent Number: 5,062,106
[45] Date of Patent: Oct. 29, 1991

[54] ATM EXCHANGE SYSTEM

[75] Inventors: Katsuyuki Yamazaki; Masanobu Fujioka, both of Saitama, Japan

[73] Assignee: Kokusai Denshin Denwa Co., Ltd., Tokyo, Japan

[21] Appl. No.: 490,244

[22] Filed: Mar. 8, 1990

[30] Foreign Application Priority Data

Mar. 14, 1989 [JP] Japan .................................. 1-59760

[51] Int. Cl.$^5$ .............................................. H04J 3/24
[52] U.S. Cl. .................................... 370/94.1; 370/60; 370/85.6; 340/825.5; 340/825.52
[58] Field of Search ....................... 370/94.1, 60, 60.1, 370/53, 58.1, 58.2, 58.3, 85.6, 91, 92; 340/825.5, 825.51, 825.52

[56] References Cited

U.S. PATENT DOCUMENTS

| | | | |
|---|---|---|---|
| 4,947,388 | 8/1990 | Kuwahara et al. | 370/94.1 |
| 4,956,839 | 9/1990 | Torii et al. | 370/60 |
| 4,964,119 | 10/1990 | Endo et al. | 370/94.1 |
| 4,969,149 | 11/1990 | Killat et al. | 370/94.1 |

OTHER PUBLICATIONS

"Wideband Packet Technology for Switching Systems", Luderer et al, IEEE International Switching Symposium, Mar. 15-20, 1987, Phoenix, Ariz., pp. 0448-0454.

Primary Examiner—Douglas W. Olms
Assistant Examiner—Alpus H. Hsu
Attorney, Agent, or Firm—Armstrong, Nikaido, Marmelstein, Kubovcik & Murray

[57] ABSTRACT

An ATM (asynchronous transfer mode) exchange system for high speed packet exchange with a fixed length packet is implemented by a plurality of cell handlers (10-1 through 10-n) each related to each ATM channel, and a plurality of buses coupled with the cell handlers. An input user cell is subject to add routing information including an output cell handler number (403) and an output virtual channel identifier (404) by a virtual channel converter (12) and a routing header adder (13). The user cell which has routing information is forwarded to the bus. The cell on the bus is read out by all the cell handlers, and the particular cell handler in which the number of cell handlers coincide with the cell handler number in routing information takes the cell on the bus. In the cell handler, the cell itself read out of the bus is stored in the cell buffer memory (16), and the address of the cell buffer memory (16) of the cell is stored in the queue buffer (18). When an output channel is available, the cell is forwarded to the output channel from the cell buffer memory (16) based upon the address of the cell stored in the queue buffer (18). A plurality of queue buffers may be provided for delay time control. Congestion control is possible for loss control of a cell when an output channel is congested, based upon the number of cells waiting in the queue buffer.

7 Claims, 5 Drawing Sheets

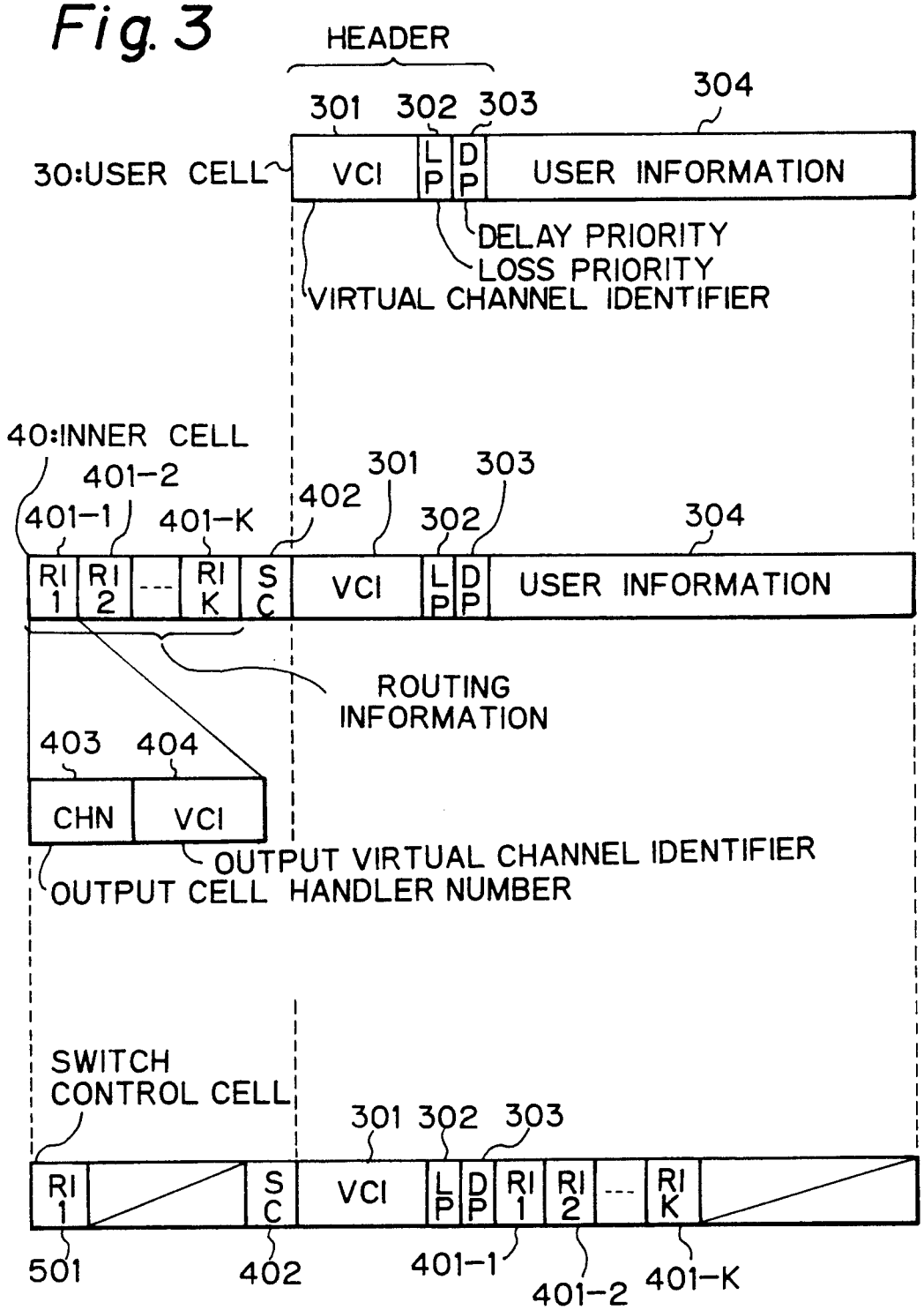

ATM EXCHANGE SYSTEM

BACKGROUND OF THE INVENTION

The present invention relates to an ATM (Asynchronous Transfer Mode) exchange system.

An ATM exchange system, which transfers all the information, including a circuit switching mode and a packet switching mode, by dividing the information into fixed length blocks (called a cell), holds promise for transmission and exchange of broadband ISDN signal (Integrated Service Digital Network).

Conventionally, a self-routing switch which uses a switch element with two inputs and two outputs and connects the same in a cascade structure has been known as an ATM exchange system.

FIG. 4 shows such a conventional exchange system. In the figure, the numerals 60-1-1 through 60-4-3 are 2×2 switch elements. Each of the switch elements is coupled together by junctors.

FIG. 5 shows the signal format for the exchange system of FIG. 4. The user cell 64 is attached a header (R1-R3) 61 through 63 for the routing in the switching system itself. The whole signals 61 through 64 are applied to the exchange system of FIG. 4.

The header (R1) 61 is one bit information for selecting one of two outputs of the first stage switches (60-1-1 through 60-4-1). Similarly, the header (R2) 62 and the header (R3) 63 are used for selecting one of two outputs at the second stages (60-1-2 through 60-4-2), and the third stages (60-1-3 through 60-4-3). Thus, the cell is switched by using the headers (R1 through R3) as if routing is automatic in the switching system.

However, the conventional system of FIG. 4 has the disadvantage that the delay time and the delay variation of a cell is rather large, since all the cells must be synchronous at the inputs at each of the stages, and therefore, a cell must wait in a buffer memory installed at the input of each switch element. Further, each switch element is theoretically subject to block a cell, and a cell might be lost in a switching element. When the traffic in the inputs of each of the switching elements is not uniform, the block and the loss of the cell in the switching system are increased rapidly.

A multi-point switching which distributes an input signal to more than two outputs is requested in a broadband ISDN based upon an ATM exchange system. Further, an addition and/or a modification of a connection during communication is desired. Therefore, an ATM exchange system must have an excellent switch control capability as compared with a conventional exchange system.

Further, a service class control is essential in an ATM exchange system which implies the control of the delay and the loss of a cell within an ATM exchange system. An ATM exchange system handles both real time communication and non-real time communication, and while both are important communication, there are instances when no loss of a cell is allowed and when some losses of cells are allowed. Therefore, an ATM exchange system must function as though a cell which is allowed to be lost is disregarded depending upon the congestion of output channels, and as though a cell with a small delay time is delivered to an output channel with a designated high priority.

SUMMARY OF THE INVENTION

It is an object of the present invention to overcome the disadvantages and limitations of a prior ATM exchange system.

It is also an object of the present invention which provides an ATM exchange system in which delay time and delay time variation are small, and a loss of a cell in an exchange system does not occur.

It is also an object of the present invention to provide an ATM exchange system which can handle a cell with a plurality of service classes for the loss of a cell and delay time of a cell.

The above and other objects are attained by an ATM exchange system comprising; a plurality of cell handlers each relating to each ATM channel; the same number of buses as that of the cell handlers coupled with each cell handler so that an output of each cell handler is forwarded to all the cell handlers through the buses. Each of the cell handler comprising; a virtual channel converter (12) coupled with an ATM channel to take a virtual channel identifier of a received user cell through the ATM channel, and to provide an output virtual channel identifier together with a cell handler number of an output channel which the cell is forwarded; a routing header adder (13) coupled with an ATM channel and an output of the virtual channel converter to generate an inner cell which has a routing header having the output cell handler number and the virtual channel identifier generated by the virtual channel converter (12), and a user cell, and forwarding the inner cell to the related bus; a same number of output buffers as that of cell handlers having a cell pick up (15) which takes an inner cell which has the output cell handler number in the routing header equal to its own cell handler number and copying an output virtual channel identifier in the routing header on a virtual channel identification area of the user cell; and a cell buffer memory (16) for storing the user cell from the cell pick up; a selector (17) coupled with outputs of all the cell handlers for selecting a cell from the cell handlers; a queue buffer (18) for storing address of the cell buffer memory (18) storing a cell selected by the selector (17); and a cell output (19) for taking out a cell in the cell buffer memory (18) based upon an address stored in the queue buffer (18).

In a preferred embodiment, a plurality of queue buffers are provided for the service class control of delay time.

Still preferably, a congestion detector is provided for detecting congestion condition of an output channel by comparing the number of cells in the queue buffers with a reference value, and an output of the congestion detector is used whether a cell is disregarded in an exchange system or not.

BRIEF DESCRIPTION OF THE DRAWINGS

The foregoing and other objects, features, and attendant advantages of the present invention will be appreciated as the same become better understood by means of the following description and the accompanying drawings wherein;

FIG. 3 shows a format of a cell in the present invention.

DESCRIPTION OF THE PREFERRED EMBODIMENTS

Figure 1:
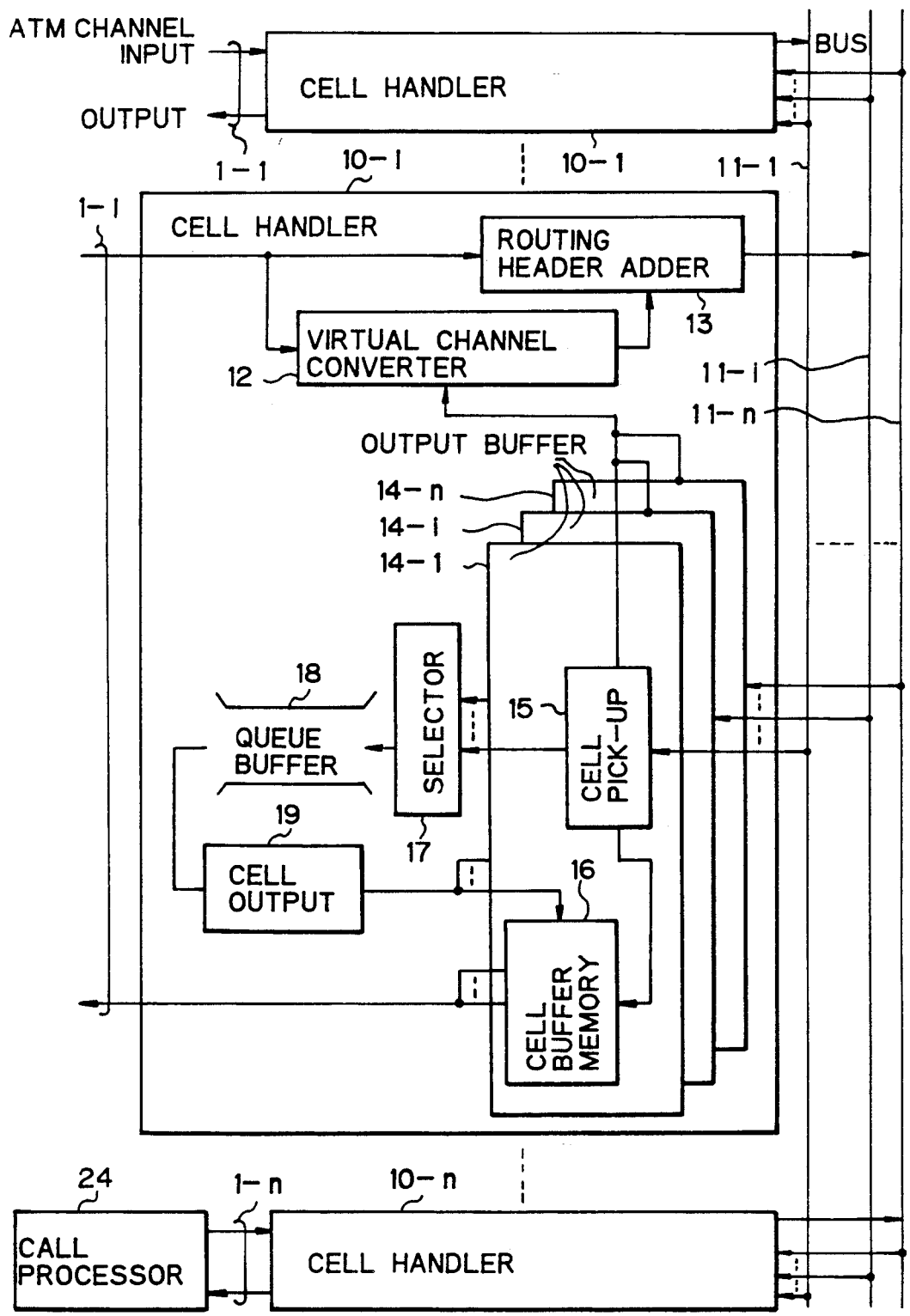
FIG. 1 is a block diagram of an ATM exchange system according to the present invention.

FIG. 1 shows a block diagram of an ATM exchange system according to the present invention. In the figure, the numerals 1-1, 1-i through 1-n are ATM circuits or ATM channels. The signal format of each ATM circuit is shown in FIG. 3 having a user cell 30 which includes header portions 301-303 and a user information portion 304. The header portions include a virtual channel identifier (VCI) 301, a loss priority (LP) 302 for designating if a loss ratio of a cell is small or large, and a delay priority (DP) 303 for designating if a delay time in an exchange system allowed to a cell is small or large. In FIG. 1, the numerals 10-1, 10-i through 10-n are cell handlers each installed for each ATM circuits 1-1, 1-i through 1-n, for implementing the essential operation of an exchange operation in the present invention. Each cell handlers 1-1, 1-i through 1-n are coupled with buses 11-1, 11-i through 11-n each of which operates in a broadcast manner. In other words, an output of a cell handler 10-i is transferred to all the cell handlers including the cell handler 10-i itself through the bus 11-i. Each cell handler has a virtual channel converter 12 which stores routing information in the signal format between an input virtual channel identifier and an output cell handler number (virtual channel identifier). The virtual channel converter 12 provides an output cell handler number (output virtual channel identifier) for each user cell from a circuit 1-i based upon the input virtual channel identifier. The routing header adder 13 attaches to the signal format the output virtual channel identifier from the virtual channel converter 12 to the user cell, and the inner cell having the user cell and the output virtual channel identifier is applied to the bus 11-i.

The cell format on the bus is shown by the numeral 40 in FIG. 3. The inner cell 40 has a user cell 30 (301 through 304), and routing headers 401-1 through 401-k for the switching operation before the user cell 30. The routing header includes at least one routing information ($RI_l$ through $RI_k$) 401-1 through 401-k, each comprising an output cell handler number (CHN) 403, and an output virtual channel identifier (VCI) 404. A plurality of routing information up to k may be included in the routing header.

The cell handler 10-i monitors the inner cells on the buses 11-1, 11-i through 11-n, and the cell pick up 15 takes the cell which has the same number as that of the cell handler 10-i itself. The cell pick up 15 copies the output virtual channel identifier 404 in the routing header of the picked up cell on the virtual channel identifier area 301 of that picked up cell. The output cell of the cell pick up 15 is temporarily stored in the cell buffer 16, and the address of that cell buffer storing that cell is forwarded to the selector 17. The cell pick up 15 and the cell buffer 16 compose an output buffer 14-1, 14-i through 14-n for each buses 11-1, 11-i through 11-n.

The selector 17 selects one of the outputs of the output buffers 14-1, 14-i through 14-n, and applies an address of the cell buffer memory 16 which is selected to the queue buffer 18. The cell output 19 reads out the cell buffer memory 16 according to the address in the queue buffer 18 based upon the first-in-first-out basis. The output of the cell buffer 16 with the address designated by the cell output 19 is forwarded to the output line of the ATM circuit.

As described above, according to the present invention, an non-block exchange is accomplished, and no loss in an exchange system occurs, since a signal on each cell handler is forwarded to all the cell handlers in a broadcast manner. Further, the queue of a cell in an exchange system is only the queue 18 at output portion, and therefore, the delay time and the delay variation in an exchange system are small. It should be noted that a prior art has the queues at each of the stages of the switch elements, and therefore, the delay time and the delay variation are large.

It should be appreciated that the present invention uses an ATM exchange system for transmission in a broadcast type bus. Therefore, the process at an input portion of a cell handler is only to attach a routing header to user information. Therefore, the structure of hardware is simplified, and the operational speed of the hardware is improved.

Further, it should be appreciated that the present invention is applicable to a multi-point connection which carries out a connection of each channel to more than two output channels. In that case, the routing header of the inner cell 40 in FIG. 3 has a plurality of routing informations 401-1 through 401-k, each having an output cell handler number and an output virtual channel identifier. The cell pick up 15 in the cell handler picks up the cell which has the routing information which coincides to that of the cell handler itself. Thus, the cell is picked up by a plurality of cell handlers. Thus, a non-block cell exchange is possible in a multi-points connection. The delay time and the delay variation are not increased in the multi-points connection.

The present invention is powerful for improving switching control capability by installing a call processor 24, coupled with a cell handler as shown in FIG. 1. In that case, switching control information is handled similar to a user cell, and is subject to cell switch. The switch control cell is shown by the numeral 50 in FIG. 3. The switch control cell 50 has an input virtual channel identifier 301 together with a loss priority 302 and a delay priority 303, and at least one of switch routing informations ($RI_l$ through $RI_k$) 401-1 through 401-k, each having an output cell handler identifier 403 and a virtual channel identifier 404. Information is stored in the virtual channel converter 12. Instead, the switching control cell 50 has no user information. The switching control cell has routing information 501 of a destination, when that cell 50 is in an exchange system. Further, it has a switch control cell identifier (SC) 402 for determining a switching control cell from user cells. A cell pick up 15 in a cell handler 14 recognizes a switching control cell in the receive cells by recognizing the identifier (SC) 402, and forwards the same to the virtual channel converter 12. Since a switching control cell is subject to switch similar to user cells, the change or modification of information in a virtual channel converter in a cell handler is easy, and the capability for the establishing and/or releasing of a switch during communication is improved.

FIG. 2 shows a block diagram of another embodiment of the present invention, in which the service class control for delay time and loss of a cell is effected.

The embodiment of FIG. 2 has a plurality of queue buffers 20 and 21. The first queue buffer 20 stores the cells which request short delay time, and the second queue buffer 21 stores cells which allow long delay time. The selector 17 applies a cell which requests a short delay time to a first queue buffer 20, and applies a cell which allows a long delay time to a second queue buffer 21, depending upon a delay priority DP in a user cell. The cell output 19 reads out a cell in the first queue buffer 20 with a higher priority than that of a cell in the second queue buffer 21. In other words, the cell output 19 reads out the content of the first queue buffer 20, and only when no cell is stored in the first queue buffer 20, the cell output 19 reads out the content of the second queue buffer 21. With the above operation, a delay time and a delay variation of a cell which requests short delay time may be further become small.

The loss control of a cell is effected by a congestion detector 22 and a loss control 23 in FIG. 2. The congestion control 22 recognizes whether an output channel is busy or not, based upon the sum of cells in the queue in the queue buffers 20 and 21, and forwards the recognized information to the loss control 23. The loss control 23 disregards a cell which has no flag of loss priority LP in a user cell, when an output channel is congested. Thus, the loss ratio of cells may be small for cells with a flag ON of loss priority LP, even when an output channel is congested.

The delay priority DP and the loss priority LP are included in a header of a cell as shown by 302 and 303 in FIG. 3. As a modification, those priorities may be included in a user cell which is received from an input channel, alternatively, those priorities may be generated in an exchange system as a call control protocol.

It should be appreciated that the loss control 23 and the selector 17 handle only the priorities 302 and/or 303, and the address of the cell buffer memory 16, but do not process a user cell itself. That is to say, long information in a user information portion 304 in a user cell does not move for the process of the loss control and/or the delay control. Therefore, the service class control according to the present invention is carried out with high speed.

Figure 2A:
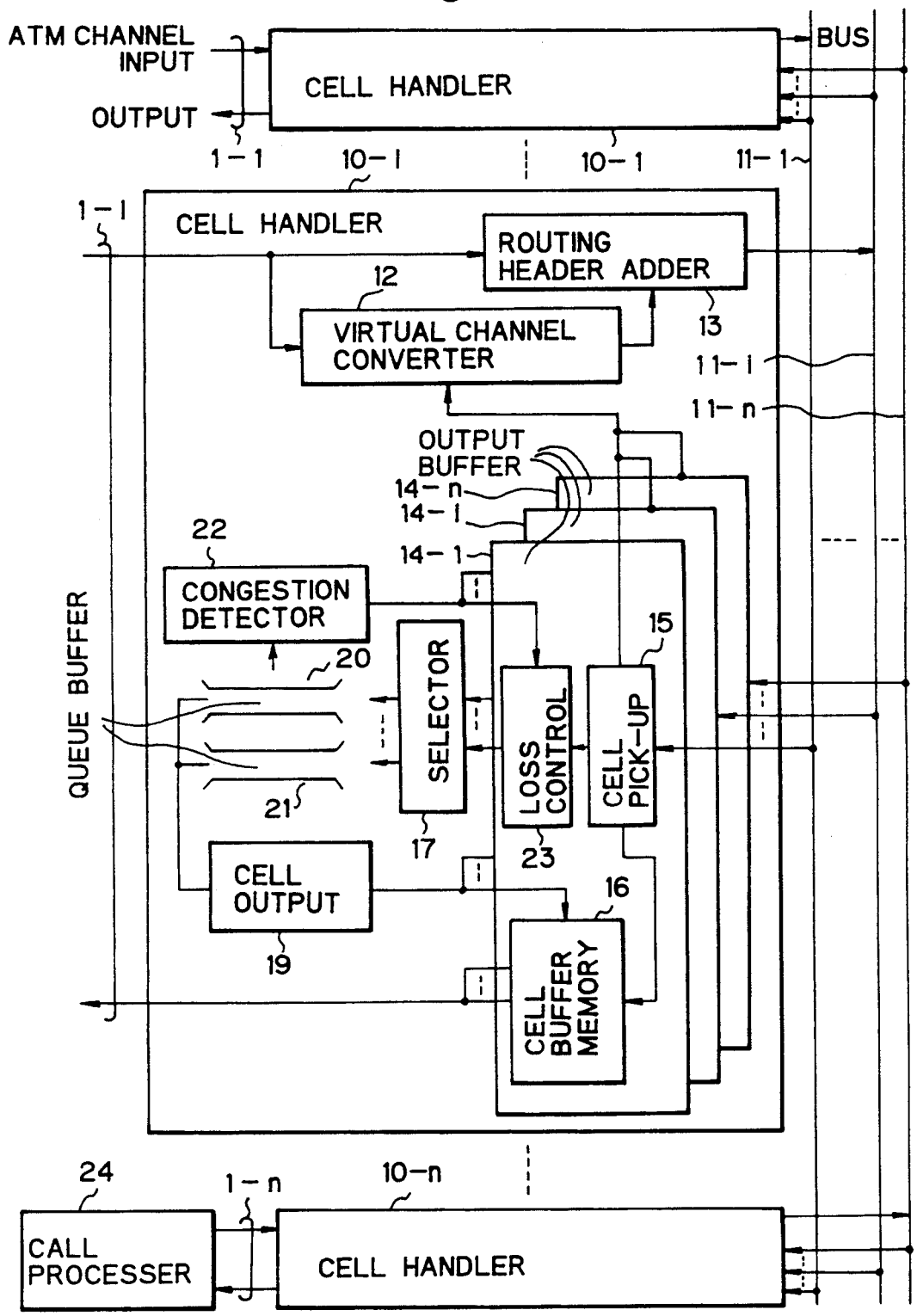
FIG. 2A is a block diagram of another embodiment of an ATM exchange system according to the present invention.
Figure 2B:
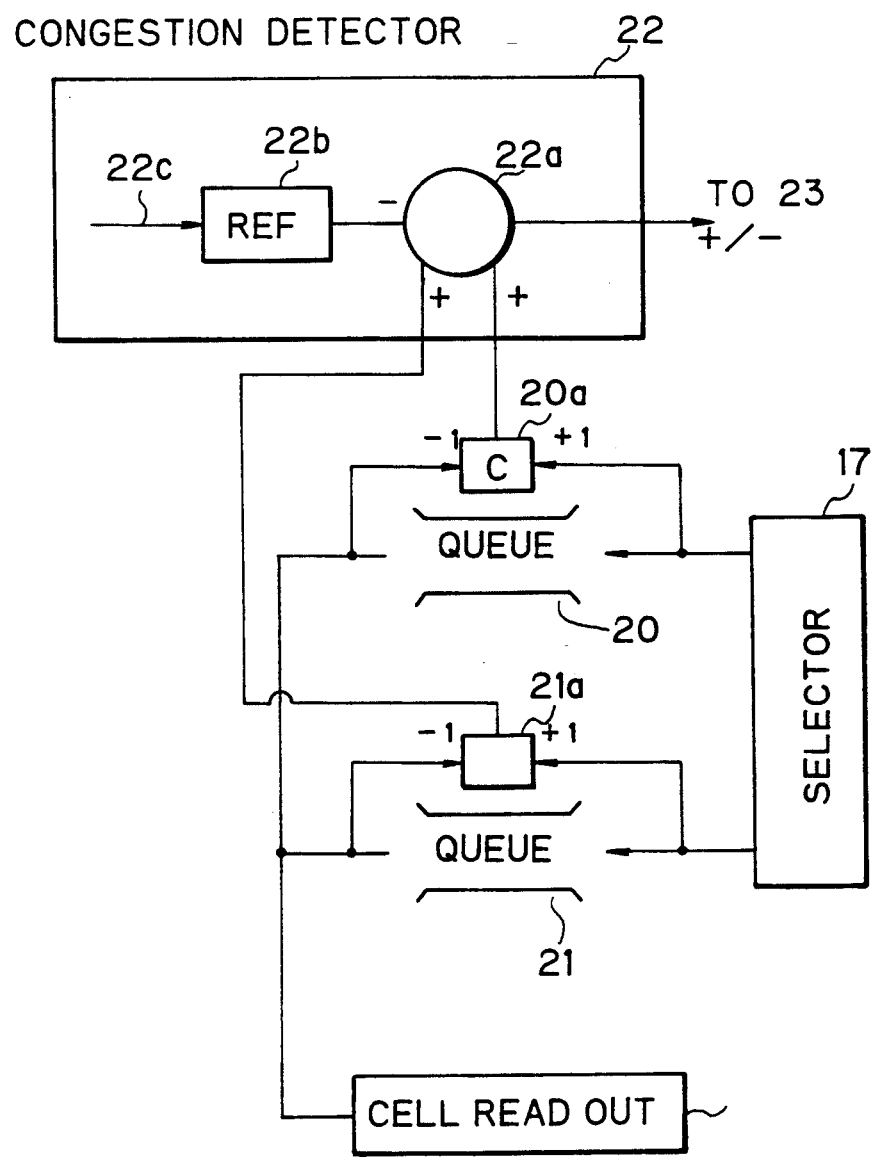
FIG. 2B is a block diagram of a congestion detector 22 in FIG. 2A.
Figure 4:
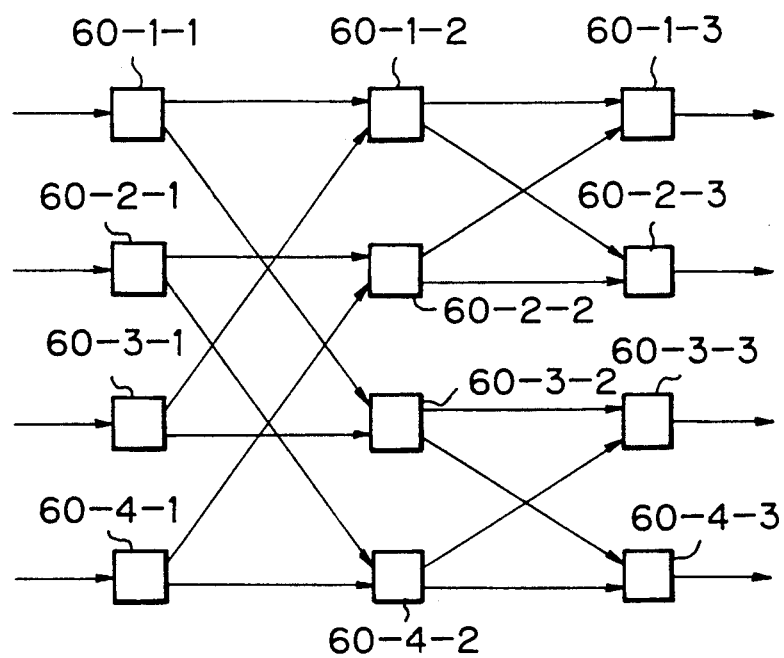
FIG. 4 is a block diagram of a prior ATM exchange system.
Figure 5:
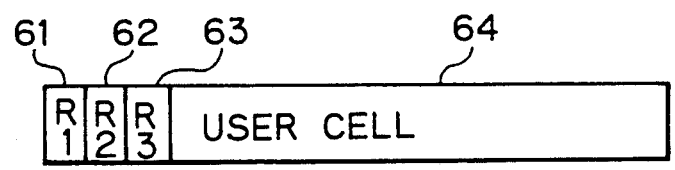
FIG. 5 shows a format of a cell in a prior art.

FIG. 2B shows a detailed block diagram of the queue buffers and the congestion detector in FIG. 2A. The queue buffers 20 and 21 have counters 20a and 21a, respectively, for counting the number of cells in the queues. Each of those counters is incremented when a cell is input to the queue, and is decremented when a cell is taken out of the queue. The congestion detector 22 has a reference means 22b which provides reference value of the queue in digital form, and an adder 22a. The reference value in 22b is adjustable by an external signal 22c. The adder 22a adds the outputs of the counters 20a and 21a, and also subtracts the output of the reference means 22b. The output of the adder 22a is applied to the loss control 23 in FIG. 2A. When the output of the adder 22a is positive, it indicates that the channel is congested, and the negative output of the adder 22a indicates that the channel is not congested.

As described above, according to the present invention, a non-block ATM exchange system is provided with short delay and small delay variance of a cell, and no loss of a cell. The exchange of a channel to a plurality of output channels is possible, and the high switching capability is carried out. Further, a service class control of a delay time and a loss ratio is carried out.

From the foregoing it will now be apparent that a new and improved ATM exchange system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An ATM exchange system having information formatted into user cells comprising:
    a plurality of cell handlers each relating to an ATM Channel;
    a plurality of buses, each bus coupled with each cell handler so that an output of each cell handler is forwarded to all the cell handlers through said plurality of buses;
    each of said cell handler including
        a virtual channel converter, coupled with said ATM channel, to provide an output of virtual channel identifier together with an output cell handler number of an output ATM channel to which the user cell is forward,
        a routing header adder, coupled with said ATM channel and an output of said virtual channel converter, said routing header adder to generate an inner cell, which has a routing header having said output cell handler number and said output virtual channel identifier generated by said virtual channel converter, and to attach said inner cell to said user cell, and said routing header adder forwarding said inner cell and user cell to a related bus,
        a plurality of output buffers, each buffer corresponding to one cell handler, each buffer having
            a) a cell pick up which picks up said inner cell and user cell which has said output cell handler number in said routing header equal to its own cell handler number and copying said output virtual channel identifier in said routing header in a virtual channel identification area of said user cell, and b) a cell buffer memory for storing said user cell from said cell pick up,
        a selector coupled with outputs of the plurality of output buffers for selecting a user cell,
        queue buffer for storing an address of said cell buffer memory which stores said user cell selected by said selector, and
        a cell output for outputting said user cell in said cell buffer memory based upon the address stored in said queue buffer.

2. An ATM exchange system according to claim 1, wherein said routing header in said inner cell has a plurality of sets of output cell handler numbers and output virtual channel identifiers, and said cell pick up takes all the inner and user cells which have the same said cell handler number as that of its own cell handler.

3. An ATM exchange system according to claim 1, wherein a cell processor, providing cell control protocol and call processing, is coupled with said cell handler, and said call processor provides switching information to said virtual channel converter in a form of said user cell.

4. An ATM exchange system according to claim 1 wherein said user cell has a header portion having a delay priority for indicating that the user cell is allowed only a short delay time, and said queue buffer has a first queue buffer and a second queue buffer, and said cell output reads out said first queue buffer prior to said second queue buffer when said delay priority is active.

5. An ATM exchange system according to claim 1, wherein said user cell has a header portion having a loss priority for indicating that the user cell is allowed small probability of loss in a congestion condition, a congestion detector is provided for detecting the congestion condition of an output ATM channel based upon a number of user cells in said queue buffer, and a loss control is provided in each of the cell handlers for disregarding a user cell which has no positive flag in said loss priority when an output of said congestion detector indicates congestion condition of an output channel.

6. An ATM exchange system according to claim 1, wherein signal format on said buses is a same as that of said ATM exchange system, and an only process at an input portion of said cell handler is to add a routing header to said user cell.

7. An ATM exchange system according to claim 5, wherein said congestion detector has a reference means for providing a reference value in a digital form, and an adder for providing a different between a sum of numbers of said queue buffers and an output of said reference means, and said reference value is adjustable by an external signal.

* * * * *